United States Patent

Tatsumi

[11] Patent Number: 5,641,367
[45] Date of Patent: Jun. 24, 1997

[54] PROCESS FOR ULTRASONIC SEALING AN ANODE CUP INTO A GASKET FOR ELECTROCHEMICAL CELLS

[75] Inventor: James George Tatsumi, North Ridgeville, Ohio

[73] Assignee: Eveready Battery Company, St. Louis, Mo.

[21] Appl. No.: 540,837

[22] Filed: Oct. 11, 1995

Related U.S. Application Data

[63] Continuation of Ser. No. 131,177, Oct. 4, 1993, abandoned.

[51] Int. Cl.$^6$ .................................................. B29C 65/08
[52] U.S. Cl. .................... 156/69; 156/73.1; 156/196; 156/221; 156/293; 156/298; 156/303.1; 264/445
[58] Field of Search ................ 156/69, 73.1, 196, 156/221, 293, 294, 298, 303.1; 264/442, 443, 445; 228/1.1, 110.1

[56] References Cited

U.S. PATENT DOCUMENTS

| | | | |
|---|---|---|---|
| 3,184,353 | 5/1965 | Balamuth et al. | 156/73.1 |
| 3,775,189 | 11/1973 | Jaggard | 136/175 |
| 3,981,759 | 9/1976 | Summo | 156/73.5 |
| 4,259,419 | 3/1981 | Uba et al. | 429/174 |
| 4,558,957 | 12/1985 | Mock et al. | 156/73.1 X |
| 4,631,685 | 12/1986 | Peter | 156/73.1 X |
| 4,993,007 | 2/1991 | Meister | 156/73.1 X |
| 5,058,933 | 10/1991 | Mackal | 156/293 X |

FOREIGN PATENT DOCUMENTS

| | | |
|---|---|---|
| 007091 | 1/1980 | European Pat. Off. . |
| 058088 | 8/1982 | European Pat. Off. . |
| 2118038 | 7/1972 | France . |
| 004835 | 1/1980 | Japan . |
| 088254 | 4/1987 | Japan . |
| 202454 | 9/1987 | Japan . |
| 175332 | 7/1988 | Japan . |

Primary Examiner—James Sells
Attorney, Agent, or Firm—Robert W. Welsh; Vivien Y. Tsang

[57] ABSTRACT

A gasket-cover assembly for use as a closure for an electrochemical cell which is produced by a process in which an extended wall of the cover is ultrasonically forced into a flange of a gasket such that the flange of the gasket makes a "U" shaped enclosure about the bottom wall of the cover.

12 Claims, 2 Drawing Sheets

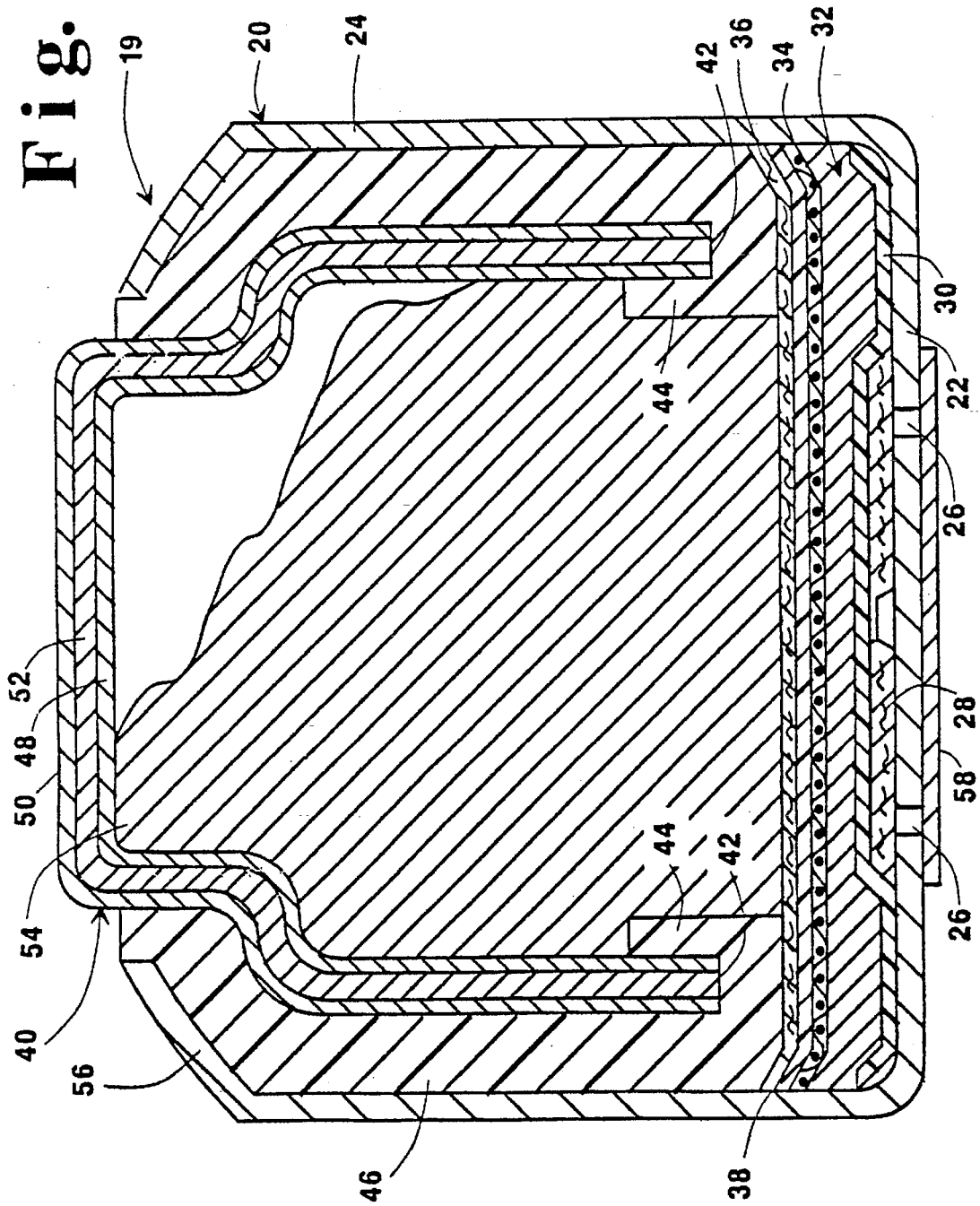

PROCESS FOR ULTRASONIC SEALING AN ANODE CUP INTO A GASKET FOR ELECTROCHEMICAL CELLS

This is a continuation, of application Ser. No. 08/131,177, filed Oct. 4, 1993, abandoned.

FIELD OF THE INVENTION

The Invention relates to the sealing of a cover, such as an anode cup for electrochemical cell, into a gasket using ultrasonic means to produce a cover-gasket assembly ideally suited for sealing a container, such as a container for an electrochemical cell.

BACKGROUND OF THE INVENTION

The miniaturization of electronic devices has created a demand for small but powerful electrochemical cells. Cells that utilize an alkaline electrolyte are known to provide high energy density per unit volume, and are therefore well suited for applications in miniature electronic devices such as hearing aids, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline manganese dioxide cells.

Many liquid electrolytes used in galvanic cells will form a corrosive salt deposit on the exterior surface of the cells in which the electrolyte is used if the electrolyte leaks out of the cell. Such a corrosive deposit detracts from the appearance and marketability of the cell. These corrosive deposits may also damage the electronic device in which the cell is housed and short the cell. Therefore such galvanic cells are sealed to prevent electrolyte leakage.

In the prior art it has been a conventional practice to incorporate insulating gaskets between the cell container and cover so as to provide a seal for the cell. Generally, the gasket must be made of a material inert to the electrolyte contained in the cell and the cell environment. In addition, it had to be flexible and resistant to cold flow under pressure of the seal and maintain these characteristics so as to insure a proper seal during long periods of storage. Materials such as nylon, polypropylene, ethylene-tetrafluoroethylene copolymer and high density polyethylene have been found to be suitable as gasket materials for most applications. Typically, the insulating gasket is in the form of a "J" shaped configuration in which the extended wall of the cover is inserted so that upon being radically squeezed, the bottom portion of the gasket forms a "U" shaped seal for the bottom portion of the wall of the container. To better insure a good seal, a sealant is generally deposited in the "J" shaped seal so that upon insertion of the cover into the gasket, the edge of the extended wall of the cover will seat in the sealant and then upon the application of a radical squeeze, the gasket will be compressed against the bottom portion of the extended cover wall. The sealant will thereby act as a further seal for the cover-gasket assembly. In addition, the sealant can also function as a gap filler to compensate for variances in the manufacture of the gasket and cover components. It is possible that deviation from the ideal component sizes of the gasket and cover could result in the active battery materials and/or electrolyte being trapped between the edge of the wall of the cover and the sealant. This could result in cell leakage. Consequently, since component parts of the gasket-cover assembly are difficult to manufacture to exact specifications and it is difficult to apply the sealant with precision to the gasket on a continuous operational basis, there is always the possibility that the assembled cells will leak. This is particularly true of small miniature cells.

It is an object of the present invention to provide a process for producing a good gasket-cover seal assembly for electrochemical cells.

It is another object of the present invention to provide a process using ultrasonic means for producing a good gasket-cover seal assembly for electrochemical cells, such as alkaline cells.

It is another object of the present invention to provide an efficient and cost effective process that uses ultrasonic means for producing a gasket-cover seal assembly for alkaline cells.

The foregoing and additional objects of the present invention will become more fully apparent from the following description and accompanying drawings.

DISCLOSURE OF THE INVENTION

The invention relates to a process for ultrasonically sealing a cover into a gasket comprising the steps;

(a) preparing a compressible gasket comprising a tubular wall with a flange extending inwardly at one end;

(b) preparing a cover with a wall extending downwardly and terminating with a bottom edge;

(c) inserting said cover into said gasket such that the bottom edge of the wall of the cover contacts the flange of the gasket; and (d) ultrasonically forcing the cover into the flange of the gasket until the flange and a bottom portion of the wall of the gasket forms a U-shaped enclosure about a portion of the bottom segment of the wall of the cover.

As used herein, the term tubular means circular, oval, square, rectangular or any polygonal shaped tubular wall.

Elastic waves of frequencies beyond the range of audibility are called ultrasonic waves. These waves are conventionally produced by quartz crystal oscillators designed for producing frequencies ranging from up to 200 to 300 kilocycles per second or higher. These ultrasonic waves can be used to produce a steady force against an object. It is this force means that are used in the present invention to insert the extended wall of a cover into a flange of a gasket to provide an excellent seal between the gasket and the bottom wall of the cover. The force to be applied to insert the bottom portion of the cover wall into the flange of the gasket has to be sufficient so that the gasket forms a "U" shaped seal about the bottom portion of the wall of the cover. Thus the settings of an ultrasonic welder has to be adjusted depending on the material of the cover and the composition of the gasket. Once these data are selected, a conventional ultrasonic welder can be used to insert the bottom wall of a cover into the flange of a gasket.

Preferably, the thickness of the flange measured parallel to the longitudinal axis of the wall of the gasket would be thicker than the thickness of the wall of the gasket so that the edge of the wall of the cover could easily be forced fitted within said flange using ultrasonic means. Preferably, the flange thickness should be at least 1.5 times thicker than the thickness of the wall of the gasket and more preferably at least 3 times thicker than the thickness of the wall of the gasket. Preferably, the insertion of the edge of the cover wall should be inserted into the gasket by at least 0.01 inch and more preferably by at least 0.015 inch to insure a good seal. It should be appreciated that the distance that the edge is inserted into the flange will depend on the material composition of the gasket-cover components and in some applications the cell system that the gasket-cover assembly will be used. In some applications, a sealant may be used between the edge of the cover wall and the flange of the gasket. Once the gasket-cover assembly is produced, it is preferable to assemble the anode of the cell into the gasket-cover assembly and then the gasket-cover-anode assembly is placed within a container of a cell housing other active and inactive components of the cell system. The container is then squeezed against the gasket-cover assembly forming a seal for the cell. Specifically, the gasket-cover assembly could be sealed to a container of the cell by turning the top portion of the container sidewall over the outer upstanding wall of the gasket thereby compressing the gasket between the container and cover so as to effectively seal said cover to and electronically insulating said cover from the container.

The sealing gasket of this invention comprises a material selected with consideration given to its stability in the presence of the electrolyte, its resiliency, and its resistance to cold flow. Suitable polymeric materials are selected from the group consisting of nylon, polytetrafluoroethylene, fluorinated ethylene-propylene, ethylene copolymer with fluorinated ethylene-propylene, chlorotrifluoroethylene, perfluoro-alkyoxy polymer, polyvinyls, polyethylene, polypropylene, polystyrene and the like. Other suitable materials would be recognizable by one skilled in the art. In some applications, additional precautions can be used in conjunction with the gasket of this invention to provide a more effective seal, such as coating the flange of the gasket surfaces with an adhesive agent such as a fatty polyamide resin. The sealing gasket of this invention is amenable to production techniques such as injection molding. The configuration of the surfaces of the gasket flanges is well suited for ease of removal from dies, punches and the like. Preferably the gasket would be nylon. The cover could be made of monel, copper, clad stainless steel, or some other conductive material. Preferably, the cover would be a triclad cover made of nickel, stainless steel and copper. However, the cover should be made of a conductive material that will not corrode or otherwise deteriorate when in contact with the materials of the cell. The container for the cell could be made of stainless steel, iron, nickel, nickel-plated steel, or some other conductive material.

Typical cell systems in which this invention can be used are alkaline manganese dioxide cells, air depolarized cells, nickel-cadmium cells and silver oxide-zinc cells.

BRIEF DESCRIPTION OF THE DRAWINGS

The present invention will become apparent from the following description thereof when considered together with the accompanying drawings which are set forth as being exemplary of embodiments of the present invention and are not intended, in any way, to be limitative thereof and wherein:

FIG. 5 is a cross-sectional view of the gasket-cover assembly of FIG. 4 assembled in an alkaline cell.

DETAILED DESCRIPTION OF THE DRAWINGS

Figure 1:
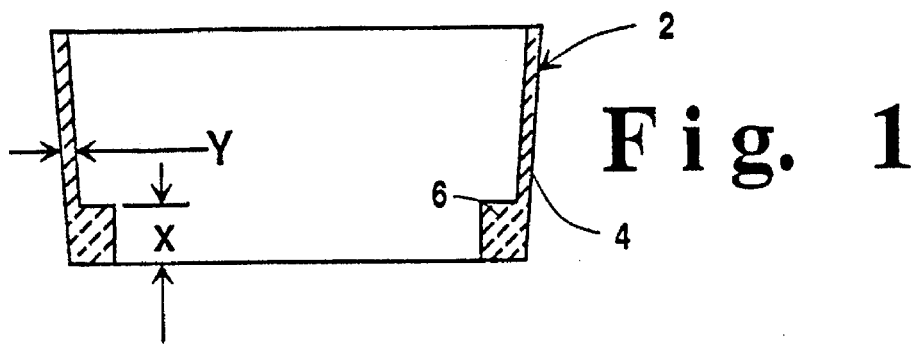
FIG. 1 is a cross-sectional view of a cylindrical gasket for use in this invention.
Figure 2:
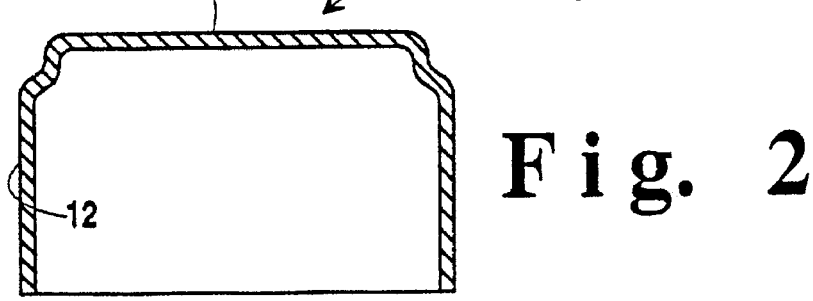
FIG. 2 is a cross-sectional view of an anode cover for use in this invention.

FIG. 1 shows a cylindrical gasket 2 comprising an upstanding cylindrical wall 4 terminating with an inwardly extended flange 6. The thickness X of flange 6 is thicker than the thickness Y of upstanding wall 4. FIG. 2 shows an anode cup 8 comprising a top cover 10 and extended cylindrical side wall 12. This anode cup 8 is shown as one material but preferably would be composed of two or more layers of different materials and most preferably would be a triclad of nickel, stainless steel and copper.

Figure 3:
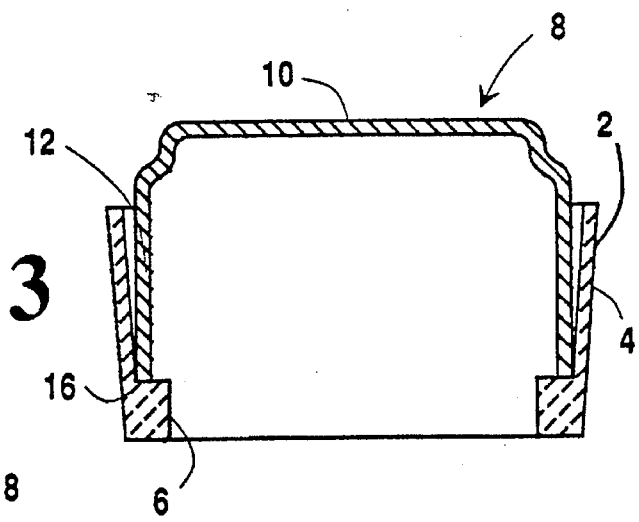
FIG. 3 is a cross-sectional view of the cover of FIG. 2 inserted within the gasket of FIG. 1.
Figure 4:
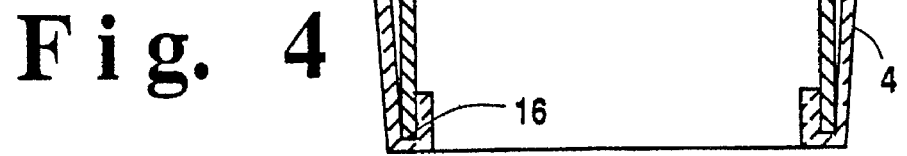
FIG. 4 is a cross-sectional view of the gasket-cover assembly of FIG. 3 after the bottom edge of the cover was ultrasonically inserted into the flange of the gasket.

FIG. 3 shows the cover 8 of FIG. 2 inserted in gasket 2 of FIG. 1 so that the bottom edge 16 of cover 8 rest on flange 6. FIG. 4 shows the edge 16 of cover 8 imbedded in flange 16 after being ultrasonically forced into flange 16. As can be seen from FIG. 4, flange 6 forms a "U" shaped seal encasement about edge 16 of the cover. If desired, a sealant could be disposed between the edge 16 and flange 6. In addition, to facilitate the insertion of edge 16 into flange 6, the edge 16 of cover 8 could be tapered to form a blunt edge surface. Preferably the taper would be less than 45° as measured from the longitudinal axis of the gasket and more preferably between 15° and 30°.

Shown in FIG. 5 is a zinc air cell 19 in which the largest component of the cell 19 is an open ended metal container 20 identified as a cathode cup. The cathode cup 20 is generally made from nickel plated steel that has been formed such that it has a relatively flat central region 22 which is continuous with and surrounded by an upstanding wall 24 of uniform height. Two small holes 26 are punched into the bottom 22 of cup 20 to act as air-entry ports. A layer of porous material 28 covers the interior surface of the air holes 26 and acts as an air distribution membrane 28. A layer of polytetrafluoroethylene 30 covers the entire bottom of cathode cup 20 including the air distribution membrane 28. The second major component is an air electrode 32 which is positioned adjacent the inside surface of the polytetrafluoroethylene layer 30. This electrode 32 contains several components, including: a metal screen 34; a mixture of manganese oxides and carbon embedded in screen 34; a barrier film 36 which prevents the anode's electrolyte from moving into the cathode 32; and a soak up separator 38. The third component is a generally cup-shaped metal cover 40 which forms the top of the cell and is generally referred to as the anode cup. In FIG. 5 the edge 42 of the anode cup 40 has been ultrasonically inserted into the flange 44 of gasket 46 according to this invention. The anode cup 40 can be made from a trilaminate material comprising copper 48 that has been laminated to the bare side of a nickel-clad steel strip. A nickel layer 50 protects the exterior surface of steel strip 52 which is located between nickel layer 50 and copper layer 48. Other laminated materials from which anode cups may be made include: a bilaminate of copper on a stainless steel substrate or a laminate made from more than three layers. Round disks punched from this laminated metal strip are then formed into anode cups. The copper layer forms the inside surface of the anode cup and directly contacts the anodic mixture. The fourth component is the anodic mixture 54 which can comprise a mixture of zinc particles, electrolyte and organic compounds such as binders and corrosion inhibitors, which make up the battery's anode. The cathode cup 20 along with the inserted air electrode 32 and associated membranes, are inverted over and pressed against the anode cup/gasket assembly which is preassembled according to this invention and containing the anode. While inverted, the edge of the cathode cup 20 is collected inwardly. The rim 56 of the cathode cup is then compressed against the elastomeric gasket 46 between the cathode up 20 and the anode cup 40 thereby forming a seal and an electrical barrier between the anode cup 40 and the cathode cup 20. A suitable tape 58 can be placed over the opening 26 until the cell is ready for use.

The following example is provided to illustrate the concept of the invention and is not intended to limit the scope of the invention which is recited in the appended claims.

EXAMPLE

It was discovered that a 0.008 inch thick triclad (nickel, stainless steel, copper) straight walled anode cup with an overall height of 0.163 inch could be inserted approximately 0.006 inch into a 0.020 inch flanged ("J" channeled) gasket (constant thickness gasket) with the use of a ultrasonic welder. The anode cup and gasket were mated by hand and placed under the horn of a welder with the anode cup facing the horn. Pressure and ultrasonic waves were then applied and the total downward travel controlled by a positive stop. This yielded an anode/gasket assembly with an overall height of 0.177 inch instead of the normal mated height of 0.183 inch. The welder was a Branson Welder series 800 model 8400 equipped with a flat horn. Settings for the welder for inserting the cover into the gasket were as follows:

| Down Speed | 6 |
|---|---|
| Pressure | 10 psi |
| Weld Time | <0.2 sec. |
| Hold Time | 0.3 sec. |
| Trigger Setting | 5 |
| Power | 100 |

Zinc air cells were manufactured using this gasket-cover assembly and showed good sealing characteristics.

Molded thick flanged (0.040 inch) gaskets were then made. These gaskets had a thicker flange (X) than the wall thickness (Y) such that X was 0.040 inch and Y was 0.010 inch. An 0.008 inch triclad anode cup with an overall height of 0.174 inch was used with these gaskets. It was found that the initial settings for the ultrasonic welder used for the 0.020 inch flange gaskets would not accomplish the necessary insertion of the cover. Thus the settings were changed as follows:

| Down Speed | 6 |
|---|---|
| Pressure | 14 |
| Weld Time | 0.8 sec. |
| Hold Time | 0.3 sec. |
| Trigger Setting | 5 |
| Power | 100 |

These settings yielded an overall height of the anode/gasket assemblies of 0.184 inch which represented an insertion of 0.030 inch and an effective gasket flange thickness under the edge of the cover of 0.010 inch. It was observed during this test that some deformation of the gasket's outer gasket diameter could occur and to correct this the gasket could be held in place by the use of a carrier which had the desired gasket outer dimensions while the cover was ultrasonically inserted into the flange of the gasket.

The data from the test demonstrate that (1) better and more accurate fit can be obtained between the gasket and anode cover; (2) assembly heights can be maintained and controlled; (3) tolerance of component parts become less critical; (4) easier manufacturing means can be employed to produce the "L" shaped gasket; and (5) the sealing area increases due to deeply seated cover insertion into the flange of the gasket.

It is to be understood that modifications and changes to the preferred embodiment of the invention herein shown and described can be made without departing from the spirit and scope of the invention.

What is claimed:

1. A process for producing an electrochemical cell, comprising the steps:

(a) preparing a compressible gasket made from a polymeric material and comprising a tubular wall with a flange extending inwardly at one end;

(b) preparing a cover, made from a metallic material, said cover comprising a wall extending downwardly and terminating with a bottom edge;

(c) inserting said cover into said gasket such that the bottom edge of the wall of said cover contacts the flange of said gasket;

(d) ultrasonically forcing said cover into the flange of said gasket until the flange and a bottom portion of the wall of said gasket form a U-shaped enclosure about a portion of the bottom segment of the wall of said cover; and, (e) assembling a cover-gasket assembly of step (d) over and into a cell container with the active components of a cell contained within said cover-gasket assembly and container and then turning the top portion of the container over the wall of said gasket thereby compressing said gasket between the container and said cover so as to effectively seal said cover to and electrically insulate said cover from the container.

2. The process of claim 1 wherein the gasket is nylon and the cover is a triclad of nickel, stainless steel and copper.

3. The process of claim 1 wherein in step (e) the active components of the cell are selected from the group comprising zinc and manganese dioxide; nickel and cadmium; and silver oxide and zinc.

4. The process of claim 3 wherein the gasket is made of a material selected from the group consisting of nylon, polytetrafluoroethylene, fluorinated ethylene-propylene, ethylene copolymer with fluorinated ethylene-propylene, chlorotrifluoroethylene, perfluoroalkyoxy polymer, polyvinyls, polyethylene and propylene polystyrene.

5. The process of claim 3 wherein the cover is made of a conductive material selected from the group consisting of monel, copper and clad stainless steel.

6. The process of claim 3 wherein the gasket is nylon and the cover is a triclad of nickel, stainless steel and copper.

7. The process of claim 3 wherein the active components of the cell are zinc and manganese dioxide.

8. The process of claim 7 wherein in step (d) the edge of the cover is inserted into the flange of the gasket by at least 0.010 inch.

9. The process of claim 8 wherein in step (d) the edge of the cover is inserted into the flange of the gasket by at least 0.015 inch.

10. The process of claim 1 wherein the thickness of the flange measured parallel to the longitudinal axis of the wall of the gasket is at least 1.5 times thicker than the thickness of the wall of the gasket.

11. The process of claim 10 wherein the thickness of the flange measured parallel to the longitudinal axis of the wall of the gasket is at least 3 times thicker than the thickness of the wall of the gasket.

12. The process of claim 11 wherein the gasket is nylon and the cover is a triclad of nickel, stainless steel and copper.

* * * * *